No. 679,351. Patented July 30, 1901.
W. B. WILLIAMS.
MANUFACTURE OF RIBBED PIPES.
(Application filed Apr. 26, 1900.)
(No Model.) 4 Sheets—Sheet 1.
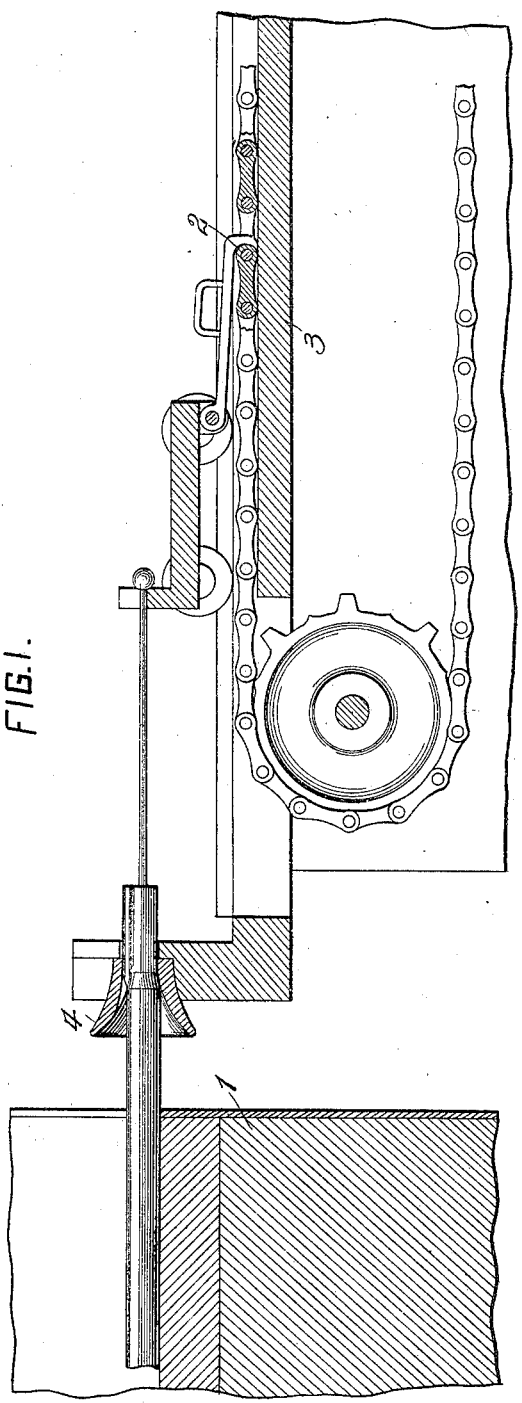
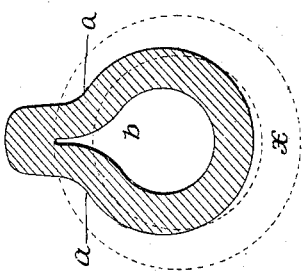
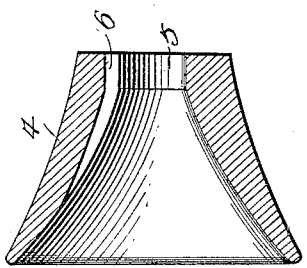
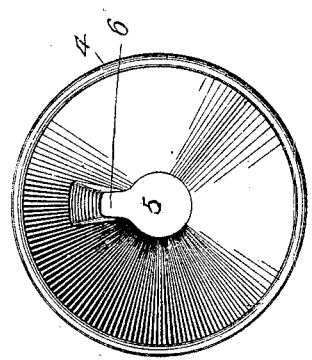
WITNESSES:
Herbert Bradley.
F. H. Dapper.
INVENTOR
William B. Williams
by Dennis S. Wolcott Att'y.

No. 679,351. Patented July 30, 1901.
W. B. WILLIAMS.
MANUFACTURE OF RIBBED PIPES.
(Application filed Apr. 26, 1900.)
(No Model.) 4 Sheets—Sheet 2.

WITNESSES:
Herbert Bradley
F. M. Dapper

INVENTOR
William B. Williams
by Dennis S. Wolcott Att'y.

No. 679,351. Patented July 30, 1901.
W. B. WILLIAMS.
MANUFACTURE OF RIBBED PIPES.
(Application filed Apr. 26, 1900.)
(No Model.) 4 Sheets—Sheet 4.

WITNESSES:
Herbert Bradley.
F. M. Dapper.

INVENTOR
William B. Williams
by Dennis S. Wolcott Att'y.

ized text here.

UNITED STATES PATENT OFFICE.

WILLIAM B. WILLIAMS, OF READING, PENNSYLVANIA, ASSIGNOR TO ALEX LAUGHLIN, OF SEWICKLEY, PENNSYLVANIA.

MANUFACTURE OF RIBBED PIPES.

SPECIFICATION forming part of Letters Patent No. 679,351, dated July 30, 1901.

Application filed April 26, 1900. Serial No. 14,404. (No model.)

*To all whom it may concern:*

Be it known that I, WILLIAM B. WILLIAMS, a citizen of the United States, residing at Reading, in the county of Berks and State of Pennsylvania, have invented or discovered certain new and useful Improvements in the Manufacture of Ribbed Pipes, of which improvements the following is a specification.

In an application, Serial No. 14,402, filed April 26, 1900, I have described and claimed a pipe having a longitudinal rib or ribs formed integral therewith. The invention described herein relates to a method of forming such ribbed pipes; and it consists, generally stated, in forcing portions of the wall of the pipe toward or to a line parallel with but eccentric to the axis of the pipe.

The invention is hereinafter more fully described and claimed.

Figure 5:
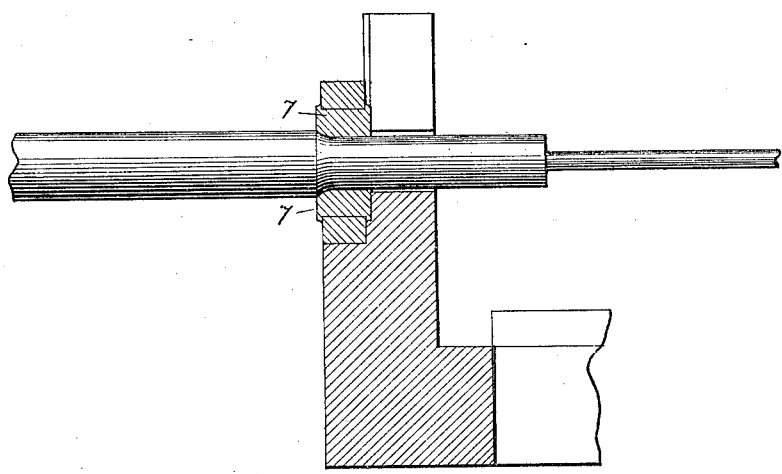
Figure 6:
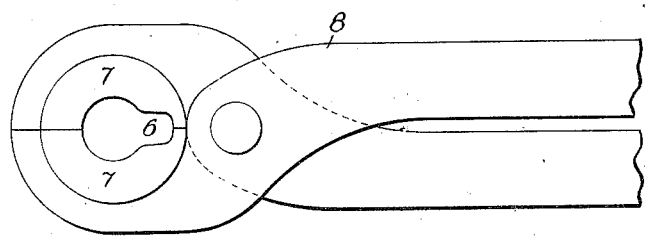
Figure 7:
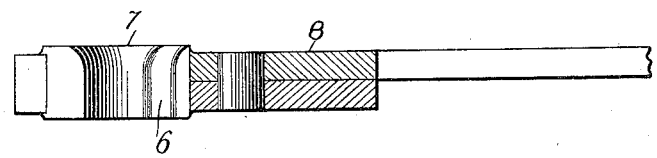
Figure 8:
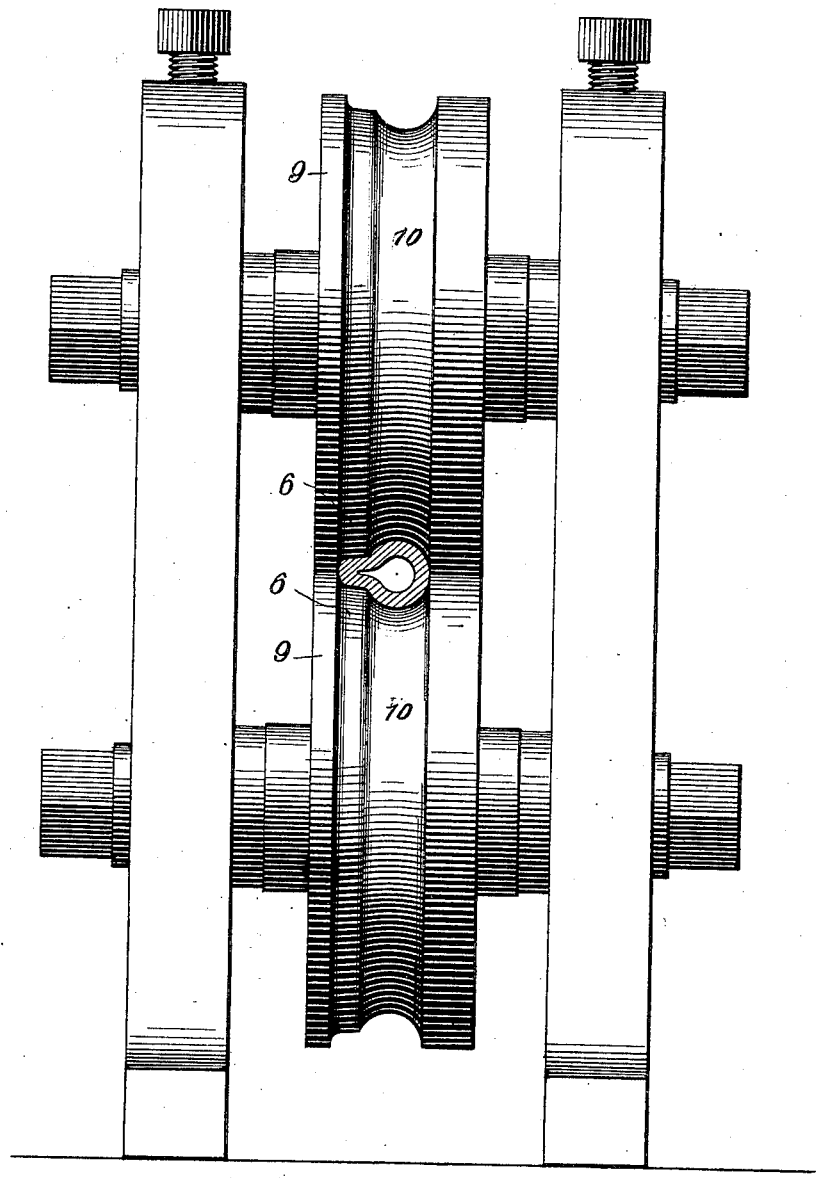
Figure 9:
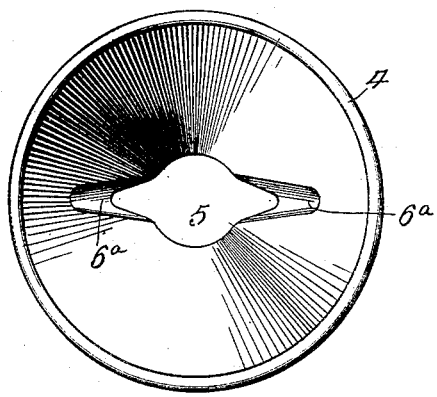
Figure 10:
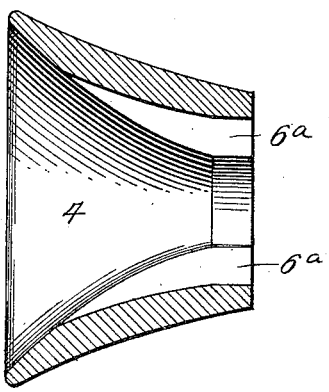
Figure 11:
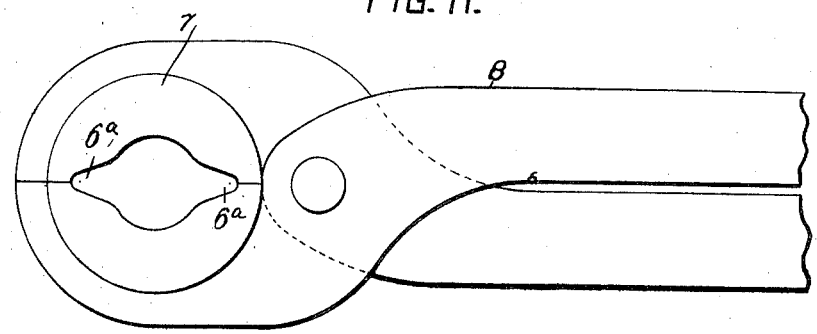
Figure 12:
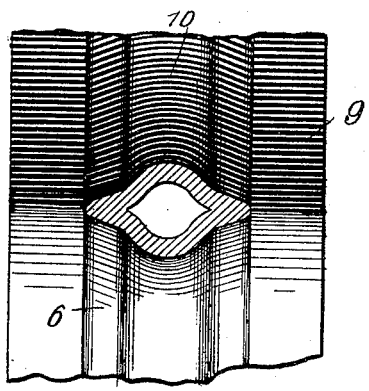
Figure 13:
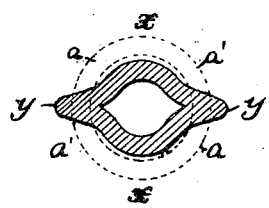

In the accompanying drawings, forming a part of this specification, Figure 1 illustrates a form of apparatus adapted to the practice of my invention. Figs. 2 and 3 are end and sectional elevations of the shaping-bell. Fig. 4 is a diagrammatic view illustrating the manner of bending the pipe to form the rib. Fig. 5 is a view showing the manner of drawing a pipe through shaping-dies held by tongs. Figs. 6 and 7 are side and sectional elevations of the tongs and dies. Fig. 8 is a front elevation of a pair of shaping-rolls. Figs. 9 and 10 are end and sectional elevations of a bell constructed to bend a pipe so as to produce two ribs thereon. Fig. 11 is a side elevation of tongs adapted for the same purpose. Fig. 12 is an elevation of portions of rolls having a pass adapted to form two ribs on a pipe, and Fig. 13 is a diagrammatic view illustrating the manner of producing two ribs on the pipe.

In the practice of my invention the pipe is formed by any of the usual or known methods of the art—as, for example, by drawing through welding bells or tongs or by feeding through between suitable welding-rolls. After the pipe has been formed it is heated in a suitable furnace 1 and then drawn by a tang or tongs connected to the usual draft mechanism 2 of a draw-bench 3 through a bell 4, supported in the usual or any suitable manner. The circular-shaping portion 5 of the bell is made of a diameter smaller than the pipe to be shaped and equal to the external diameter of the body portion of the pipe to be produced. At one side of the circular-shaping portion the bell is provided with a gradually-narrowing groove or shaping-recess 6. This shaping-recess has a transverse contour at its narrowest part corresponding to the desired external contour of the rib to be formed. In lieu of the bell dies 7, having a suitably-constructed shaping-matrix and secured to tongs 8, may be employed for shaping the pipe, or rolls 9, having grooves 10, constructed in accordance with rules known in the art to form a pass corresponding in contour to the external contour desired in the finished pipe, may be employed. It is characteristic of the operation of each of these shaping mechanisms that a portion $x$ between points $a$ of the wall of the original pipe is reduced in diameter, the surplus metal being forced toward the shaping-recess 6 in each of the mechanisms, and at the same time reducing pressure is applied along lines passing through points $a$ and parallel with the axis of the pipe to force the walls of the pipe adjacent to lines $a$ in toward a line passing through point $b$ within the pipe parallel with but eccentric to the axis.

When forming two ribs on the pipe the bell-shaping die or rolls are formed with two oppositely-disposed shaping-recesses $6^a$, as shown in Figs. 9 to 12, inclusive. By reference to Fig. 13 it will be seen that the pipe is subjected to shaping pressure along lines passing through the diametrically opposite points $a\,a'$, such pressure operating to reduce the diameter of the portions $x$ between points $a\,a'$ and to force the portions of the wall of the pipe adjacent to points $a\,a'$ inwardly while the portions $y$ are squeezed out into the recesses $6^a$.

While the construction of the perimeter of the pipe and the forcing inwardly of the portions adjacent to the lines $a$ can be effected by other instrumentalities, those described are believed to be the best for that purpose, as they can be readily substituted for the bells, dies, or rolls employed in the welding of the pipe from which the ribbed pipe is formed.

I claim herein as my invention—

1. As an improvement in the art of forming wrought-metal supporting-pipes for furnaces, the method herein described, which consists in forming a pipe from a blank or skelp, contracting the perimeter of portions of the walls of such pipe and forcing other portions of such walls inwardly toward and against each other forming an external solid rib along the pipe of a height greater than the thickness of the wall of the pipe itself, substantially as set forth.

2. As an improvement in the art of forming wrought-metal supporting-pipes for furnaces, the method herein described, which consists in contracting the perimeter of opposite portions of the pipe and forcing other portions and opposite ends of a cord of the circle of the pipe inwardly toward each other, forming an external solid rib of a thickness greater than the wall of the pipe, substantially as set forth.

In testimony whereof I have hereunto set my hand.

WILLIAM B. WILLIAMS.

Witnesses:
DARWIN S. WOLCOTT,
WALTER B. CRAIG.